United States Patent [19]

Parnell et al.

[11] Patent Number: 5,387,470
[45] Date of Patent: Feb. 7, 1995

[54] PACKAGING FILM

[75] Inventors: Colin D. Parnell, Cellina Di Leggiuno; Tito A. Fornasiero, Milan, both of Italy

[73] Assignee: W. R. Grace & Co.-Conn., Duncan, S.C.

[21] Appl. No.: 487,557

[22] Filed: Mar. 2, 1990

[51] Int. Cl.⁶ .................... B32B 27/08; B32B 27/30
[52] U.S. Cl. .................... 428/215; 428/516; 428/518; 428/520; 426/127
[58] Field of Search ............... 428/516, 215, 518, 520; 426/127

[56] References Cited

U.S. PATENT DOCUMENTS

| | | | |
|---|---|---|---|
| 4,469,742 | 9/1984 | Oberle et al. | 428/215 |
| 4,606,922 | 8/1986 | Schirmer | 426/412 |
| 4,640,856 | 2/1987 | Ferguson | 428/36 |
| 4,801,486 | 9/1986 | Quacquarella | 428/34.9 |
| 4,855,183 | 8/1989 | Oberle | 428/345 |

*Primary Examiner*—P. C. Sluby
*Attorney, Agent, or Firm*—William D. Lee, Jr.; Mark B. Quatt

[57] ABSTRACT

A multi-layer film useful in food packaging comprising a first core layer comprising VLDPE or LLDPE; optionally a second core layer comprising VLDPE or LLDPE; two outer layers each comprising an ionomer; and further core layers between the first core layer and the outer layer and between the second core layer and the outer layer the further core layers comprising an olefin polymer or copolymer. The film may also include an oxygen barrier layer and may be oriented to provide a heat shrinkable film.

20 Claims, No Drawings

PACKAGING FILM

This invention relates to a packaging film and more particularly to a film useful in the packaging of food products, especially frozen meat.

Thermoplastic film, and especially films of polyolefin materials, have been used in the past to package various articles including perishable food-products which require protection from the environment. The films should possess resistance to physical and environmental abuse during storage and distribution and should present an aesthetic and attractive appearance. Optical qualities such as high gloss, high clarity and low haze contribute to the aesthetic consumer appeal of products wrapped in such packaging materials. Good optical properties also permit adequate inspection of the packaged product during the distribution cycle and by the end-user at the point of purchase.

Shrinkability may be imparted to a thermoplastic film by orientation of the film during its manufacture. This allows the film to shrink or, if restrained, to create shrink tension within the packaging film on exposure to heat, for example, in a hot water bath or by exposure to hot air. In a typical process manufactured film is stretched in either the machine direction or perpendicular to the machine direction, or both, i.e. in the longitudinal and transverse directions respectively, in varying degrees to impart a desired degree of shrinkability to the film upon subsequent heating. After this stretching operation the film is rapidly cooled to impart latent shrinkability to the resulting film. Shrinkable film provides a tight, smooth appearance to a product wrapped in such a film as well as some added toughness in order to provide abuse resistance. It is of course desirable that the film should have good optical properties after shrinking.

Bags made from heat shrinkable polymeric films have gained acceptance for packaging meat, particularly fresh meat and processed meat. Bags made from the heat shrinkable film are supplied to a meat packer being sealed at one end with the other end open and ready to receive a meat product. After the cut of meat is placed in the bag, the bag will normally be evacuated and the open end of the bag closed by heat sealing or by applying a metal clip. This process is advantageously carried out within a vacuum chamber where the evacuation and application of a clip or heat seal is done automatically. After the bag is removed from the chamber it is heat shrunk by applying heat for example by immersing the filled bag in a hot water bath or by conveying it through a hot air tunnel.

In the usual distribution chain a whole primal or subprimal is packaged within such a shrink bag. The packaged meat will travel from a central slaughter house where it has been packaged to a retail supermarket where the bag will be opened and the meat will be cut into portions for retail sale. Thus, the bags of this type must satisfy a number of requirements which are imposed both by the slaughter house or packing house and by the bag user. Furthermore, the bag may be placed on display for retail sale to a consumer. It is therefore desirable to have an attractive package in which there has been relatively complete shrinkage of the bag around the product so that the bag is not wrinkled and so that blood and Juices are not trapped in any folds of the wrinkles. The films from which such bags are produced should therefore possess relatively high shrink as well as good optical properties particularly after shrinkage.

It is also important that the bag should be capable of physically surviving the process of being filled, evacuated, sealed, closed, heat shrunk,, boxed, shipped, unloaded and then stored for retail sale. This type of abuse rules out many polymeric films. A polymeric film having good toughness is required.

The bags must also be strong enough to survive the handling involved in moving packaged meat which may weigh 45 kg or more. In particular, when the meat is pushed into the bag its bottom seal must withstand the force of the impact.

The present invention provides a multi-layer film which has good toughness and relatively high shrink as well as good optical properties, such as clarity, after shrinkage. The multi-layer film may be produced in known manner, for example coextruded, and then oriented to provide a shrinkable film.

The present invention accordingly provides a multi-layer film comprising: (a) a core layer comprising an LLDPE or, preferably, a VLDPE; an optional second core layer comprising a VLDPE or, preferably an LLDPE; (b) two outer layers each comprising an ionomer; and (c) further core layers between the first core layer and the outer layer and between the second core layer and the outer layer, the further core layers comprising an olefin polymer or copolymer.

The multi-layer film advantageously further comprises, preferably between the first and second core layers, an additional core layer, comprising an olefin polymer or copolymer.

In the olefin polymer or copolymer the olefin is preferably ethylene; an ethylene vinyl acetate copolymer is preferred. A modified polymer may be used to improve inter-ply adhesion.

An oxygen barrier layer, for example a polyvinylidene chloride (PVDC) or an ethylene vinyl alcohol (EVOH) polymer or copolymer layer may also be included in the multi-layer film, for example between the first and second core layers.

The invention also provides a method of making a multi-layer film which comprises coextruding (a) a first core layer comprising an LLDPE or, preferably, a VLDPE; optionally a second core layer comprising a VLDPE or, preferably an LLDPE; (b) two outer layers each comprising an ionomer; and (c) further core layers between the first core layer and the outer layer and between the second core layer and the outer layer, the further core layers comprising an olefin polymer or copolymer; cooling the coextruded film; and collapsing the cooled film.

The first and second core layers in the films according to the invention are generally each 5 to 15 $\mu$m thick. The outer layers are generally each 8 to 35 $\mu$m thick. The further core layers are generally 2 to 10 $\mu$m thick.

The coextruded film may be irradiated, for example with ionising radiation such as high energy electrons, at a dosage of, for example 3 to 15 MRad. Such irradiation causes cross-linking and is generally carried out before orientation of the film.

When the film comprises a barrier layer which is a polyvinylidene chloride/polyvinyl chloride copolymer cross-linking by irradiation should take place prior to incorporation of the barrier layer in the film structure; it is known that such barrier materials are adversely affected, for example by discoloration, by irradiation.

When the film comprises a barrier layer which is an EVOH or a polyvinylidene chloride/methyl acrylate copolymer the whole multi-layer film may be irradiated.

In order to produce an oriented film the method of the invention further comprises heating the collapsed film to its orientation temperature range, optionally after irradiating the film, and stretching and orienting the heated film.

Orientation is done by racking or stretching the film at a racking rate of from about 2 to 5 times the original dimensions of the film in the longitudinal (machine) and transverse directions. To orient the film, e.g. in a blown bubble process the cooled tube is heated to its orientation temperature range. These ranges are well known for many polymeric materials and are generally below the melting point of the film. Preferably films according to the invention are heated to from 85° C. to 95° C. and more preferably from 87° C. to 92° C.

Although the description above concerning preparation of multi-layer films relates principally to tubular coextrusion and stretching by the trapped bubble technique other methods of manufacture are available such as coextruding the multi-layer film through a slot die and then stretching the film by the use of tenter frames.

Oriented multi-layer films in accordance with the invention have good abuse resistance, good optical properties, especially after shrinking, and good sealability making them especially suitable for packaging food, especially frozen meat products. Carcasses may be imported frozen, as in the case of New Zealand lamb, or frozen after slaughter locally. The meat is then cut while frozen and packaged in shrink bags for retail sale. Orientation of the multi-layer films provides toughness and improved (i.e. reduced) oxygen permeability. The films also generally have a relatively low modulus of elasticity making them easier to process, for example in bag making, and have good processability at racking.

The term "core layer" as used herein defines a layer in a multi-layer film adhered on both sides to other layers.

The term "oriented" is used to define a polymeric material which has been heated and stretched to realign the molecular configuration, the stretching being accomplished by a racking or a blown bubble process. A thermoplastic material stretched in one direction only is uniaxially oriented and a material stretched in a longitudinal as well as the transverse direction is biaxially oriented.

The term "racking3" is used herein to define a well-known process for stretching coextruded and reheated multi-layer film by means of tenter framing or a blown bubble process.

The terms "LLDPE" and "linear low density polyethylene" are used herein to describe copolymers of ethylene with one or more comonomers preferably selected from $C_4$–$C_{10}$ olefins such as but-1-ene and octene in which the molecules of the copolymers comprise long chains with few sidechain branches or cross-link structures. This molecular structure is to be contrasted with conventional low density polyethylenes which are more highly branched than their counterparts. LLDPE may also be characterised by the low pressure, low temperature processes used to produce it. LLDPE as defined herein has a density which is usually in the range of about 0.916 g/cc to about 0.925 g/cc.

The term "VLDPE" or "very low density polyethylene" as used herein refers to linear polyethylene copolymers having a density usually in the range of less than about 0.912 g/cc to about 0.860 g/cc. The terms "EVA" and "ethylene vinyl acetate copolymer" as used herein refer to a copolymer formed from ethylene and vinyl acetate monomers in which the ethylene-derived units in the copolymer are present in major amounts, preferably from about 60 to 98 percent by weight, and the vinyl acetate-derived units in the copolymer are present in minor amounts, preferably from about 2 to 40 percent by weight of the total.

The term "ionomer" as used herein is, for example, a copolymer of ethylene and a vinyl monomer with an acid group usually an ethylenically unsaturated carboxylic acid, which is generally mono-basic, for example acrylic or mothacrylic acid. It is to be understood that the term "ionomer" as used in this specification includes both the free acid and ionised form. The ionised form is preferable to the free acid form. The neutralising cation may be any suitable metal ion, for example an alkali metal ion, such as sodium, a zinc ion or other multivalent metal ion. Suitable ionomers include those sold under the trademark Surlyn marketed by Du Pont. Preferably the ionomer has a relatively low melt index.

When the ionomers are used in their free acid form the poly (ethylene-co-methacrylic acid:EMA) and poly (ethylene-co-acrylic acid:EAA) are preferred.

The term "ethylene vinyl alcohol copolymer" or "EVOH" as used herein includes saponified or hydrolysed ethylene vinyl acetate copolymers, and refers to a vinyl alcohol copolymer having an ethylene comonomer. Such copolymers are prepared by, for example, hydrolysing vinyl acetate copolymers or by chemical reaction with polyvinyl alcohol. The degree of hydrolysis is preferably at least 50 percent and more preferably at least 85 percent. The ethylene comonomer is generally present in a range of about 15 to about 65 percent.

The term "polyvinylidene chloride" as used herein includes vinylidene chloride copolymers such as those sold under the brand name "Saran" by Dow Chemical Company of the United States and which usually comprise at least 50 percent vinylidene chloride monomer with, as the comonomer, vinyl chloride or methyl acrylate, or another suitable comonomer.

The total thickness of the multi-layer films according to the invention will generally be in the range of 50 to 150 μm thick. Although thicker films may be used they are more expensive. The films will usually be in the range of 70 to 110 μm thick, thicknesses of 70 to 90 μm being particularly preferred. It will be understood that the films should not be so thin as to render them insufficiently resistant to damage during packaging of, for example bone-in meat cuts, nor so thick as to render them unnecessarily difficult to orient and to process.

It is to be understood that percentages in this specification, including the accompanying claims, are calculated on a "by weight" basis unless otherwise specified.

The following Examples illustrate the invention.

EXAMPLES

Examples of multi-layer films according to the invention are given in the following Table in which:
  (i) The thickness of each layer in μm is given in parenthesis.
  (ii) Ionomer I is Surlyn 1605 available from Du Pont; it is an ethylene/methacrylic acid copolymer comprising 15 percent of methacrylic acid, the cation being sodium. It has a melt index of 2.8.

(iii) Ionomer 2 is Surlyn 1601, available from Du Pont; it is an ethylene/methacrylic acid copolymer comprising 10 percent of methacrylic acid, the cation being sodium. It has a melt index of 1.3.
(iv) $LLDPE_1$ is a linear low density polyethylene having a density of 9.20 g/cc and a melt index of 1.
(v) $LLDPE_2$ is a linear low density polyethylene having a density of 9.17 and a melt index of 2.3.
(vi) EVA is a standard EVA comprising 18% vinyl acetate end having a melt index of 2.0.

The films were produced by a conventional tubular coextrusion technique in which, after extrusion the tube formed was cooled and flattened. The resulting tape was fed through a hot water bath, at a temperature of 87°–89° C.; on leaving the bath the tube was inflated and blown to give a wall thickness in the blown tube of about 70 μm. This "trapped bubble" technique is known in the art. The film was then rapidly cooled to set the orientation and rolled up to give the desired oriented multi-layer film.

|  | FILM LAYER | | | | | | |
|---|---|---|---|---|---|---|---|
| Example | 1 | 2 | 3 | 4 | 5 | 6 | 7 |
| 1 | Ionomer$_1$ (19) | EVA (6) | VLDPE (8) |  | LLDPE$_1$ (8) | EVA (6) | Ionomer$_2$ (23) |
| 2 | Ionomer$_1$ (19) | EVA (6) | VLDPE (8) |  | LLDPE$_2$ (8) | EVA (6) | Ionomer$_2$ (23) |
| 3 | Ionomer$_1$ (19) | EVA (8) | LLDPE$_1$ (8) |  | VLDPE (8) | EVA (5) | Ionomer$_2$ (22) |
| 4 | Ionomer$_1$ (19) | EVA (8) | LLDPE$_2$ (8) |  | VLDPE (8) | EVA (5) | Ionomer$_2$ (22) |
| 5 | Ionomer$_2$ (20) | EVA (8) | LLDPE$_2$ (8) | EVA (4) | VLDPE (8) | EVA (4) | Ionomer$_2$ (18) |
| 6 | Ionomer$_1$ (21) | EVA (8) | LLDPE$_2$ (9) | EVA (4) | VLDPE (13) | EVA (4) | Ionomer$_2$ (11) |
| 7 | Ionomer$_1$ (16) | EVA (8) | LLDPE$_2$ (9) | EVA (4) | VLDPE (13) | EVA (4) | Ionomer$_2$ (16) |
| COMPARISON |  | IONOMER$_1$ | IONOMER$_2$ | MODIFIED EVA |  | NYLON COPOLYMER |  |
| Total 70 u: |  | (20) | (33) | (6) |  | (11) |  |
| Total 90 u: |  | (26) | (42) | (7) |  | (15) |  |

In relation to the comparison film the films according to the invention all had good optical properties (those of the comparison were adjudged fair); their abuse resistance was as good as, or slightly better than, the comparison film; their processability was good, that of the comparison film being poor.

The actual thickness in μm of each film (the nominal thickness being 70 μm) and the percentage free shrink in the longitudinal (L) and transverse (T) directions are given in the following Table.

| Film | Thickness (actual) | Shrink L | Shrink T |
|---|---|---|---|
| Comparison | 61 | 33 | 45 |
| 1 | 65 | 32 | 43 |
| 2 | 64 | 33 | 44 |
| Comparison | 77 | 34 | 47 |
| 3 | 72 | 28 | 40 |
| 4 | 69 | 28 | 42 |
| Comparison | 90 | 34 | 47 |
| 5 | 70 | 30 | 42 |
| Comparison | 72 | 33 | 45 |
| 6 | 71 | 29 | 42 |
| 7 | 73 | 31 | 42 |

We claim:

1. A multi-layer film comprising (a) a first core layer comprising a linear low density polyethylene or a very low density polyethylene; (b) first and second outer layers each comprising an ionomer.

2. A film according to claim 1 in which the first core layer comprises a very low density polyethylene.

3. A film according to claim 1 which further comprises a second core layer comprising a very low density polyethylene or linear low density polyethylene.

4. A film according to claim 3 in which the second core layer comprises a linear low density polyethylene.

5. A film according to claim 3 which further comprises a further core layer between the first core layer and the first outer layer.

6. A film according to claim 5 which further comprises a further core layer between the second core layer and the second outer layer.

7. A film according to claim 1 which further comprises an additional core layer comprising an olefin polymer or copolymer between the first and second core layers.

8. A film according to claim 7 in which the olefin in the olefin polymer or copolymer is ethylene.

9. A film according to claim 7 or 6 in which the olefin polymer or copolymer is an ethylene vinyl acetate copolymer.

10. A film according to claim 1 which further comprises an oxygen barrier layer is a polyvinylidene chloride or ethylene vinyl alcohol polymer or copolymer.

11. A film according to claim 10 in which the oxygen barrier layer is a polyvinylidene chloride or ethylene vinyl alcohol polymer or copolymer.

12. A film according to claim 1 in which the first and second core layers are from 5 to 15 μm thick.

13. A film according claim 1 in which the outer layers are from 8 to 35 μm thick.

14. A film according to claim 1 in which the further core layers are from 2 to 10 μm thick.

15. A film according to claim 1 whose total thickness is from 50 to 150 μm.

16. A film according to claim 1 total thickness is from 70 to 90 μm.

17. A film according to claim 1 in which the ionomer is an ethylene/methacrylic acid copolymer which comprises, as the neutralizing cation, sodium.

18. A film according to claim 17 in which the ionomer has a low melt index.

19. A film according to claim 1 which has been irradiated by ionizing radiation.

20. A film according to claim 1 which has been oriented.

* * * * *